(12) United States Patent
Challener et al.

(10) Patent No.: US 7,590,834 B2
(45) Date of Patent: Sep. 15, 2009

(54) METHOD AND APPARATUS FOR TRACKING BOOT HISTORY

(75) Inventors: David Carroll Challener, Raleigh, NC (US); Daryl Carvis Cromer, Cary, NC (US); Mark Charles Davis, Durham, NC (US); Jerry Clyde Dishman, Cary, NC (US); Howard Jeffery Locker, Cary, NC (US); Randall Scott Springfield, Chapel Hill, NC (US)

(73) Assignee: Lenovo Singapore Pte. Ltd., Singapore (SG)

( * ) Notice: Subject to any disclaimer, the term of this patent is extended or adjusted under 35 U.S.C. 154(b) by 505 days.

(21) Appl. No.: 11/352,499

(22) Filed: Feb. 10, 2006

(65) Prior Publication Data

US 2007/0192581 A1 Aug. 16, 2007

(51) Int. Cl.
- *G06F 9/00* (2006.01)
- *G06F 12/14* (2006.01)
- *G06F 15/177* (2006.01)
- *G08B 23/00* (2006.01)

(52) U.S. Cl. ............ 713/1; 713/2; 726/22; 726/23; 726/24

(58) Field of Classification Search .......... 713/1, 713/2; 714/36, 38; 726/22, 23, 24
See application file for complete search history.

(56) References Cited

U.S. PATENT DOCUMENTS

| | | | |
|---|---|---|---|
| 6,185,678 B1 * | 2/2001 | Arbaugh et al. ........ 713/2 |
| 6,308,264 B1 | 10/2001 | Rickey ............... 713/2 |
| 6,397,268 B1 | 5/2002 | Cepulis .............. 710/8 |
| 6,466,897 B1 | 10/2002 | Yoshida ............ 702/186 |
| 6,473,857 B1 | 10/2002 | Panas et al. .......... 713/2 |
| 7,076,655 B2 * | 7/2006 | Griffin et al. ....... 713/164 |
| 7,120,786 B2 * | 10/2006 | Miller et al. ......... 713/1 |
| 7,131,026 B2 * | 10/2006 | Denninghoff et al. ..... 714/6 |
| 7,493,388 B2 * | 2/2009 | Wen et al. .......... 709/224 |
| 2001/0044782 A1 * | 11/2001 | Hughes et al. ........ 705/59 |
| 2002/0026571 A1 | 2/2002 | Rickey |
| 2002/0166072 A1 * | 11/2002 | Cromer et al. ....... 713/202 |
| 2002/0188838 A1 | 12/2002 | Welder |
| 2003/0074548 A1 * | 4/2003 | Cromer et al. ........ 713/1 |
| 2004/0006689 A1 * | 1/2004 | Miller et al. ......... 713/1 |
| 2004/0122931 A1 * | 6/2004 | Rowland et al. ...... 709/223 |
| 2004/0215949 A1 | 10/2004 | Dennis et al. |
| 2006/0282652 A1 * | 12/2006 | El-Haj-mahmoud et al. ... 713/1 |
| 2007/0038821 A1 * | 2/2007 | Peay ............... 711/162 |
| 2007/0113062 A1 * | 5/2007 | Osburn et al. ........ 713/1 |

* cited by examiner

*Primary Examiner*—Mark Connolly
(74) *Attorney, Agent, or Firm*—Rogitz & Associates; Carlos Munoz-Bustamante

(57) ABSTRACT

A computer determines whether it has been booted from a hard disk drive or from an alternate source (e.g., a floppy drive or portable memory) that entails a higher risk of importing a virus into the computer, and if it is determined that a non-HDD source was booted from, corrective action such as a virus scan can be preemptively taken.

17 Claims, 4 Drawing Sheets

INITIALIZE

RUN TIME

METHOD AND APPARATUS FOR TRACKING BOOT HISTORY

FIELD OF THE INVENTION

The present invention relates generally to methods and apparatus for tracking computer boot history.

BACKGROUND OF THE INVENTION

Computers typically "boot" from a hard disk drive. In other words, when a computer is turned on, the computer processor invokes a small operating system known as a basic input output system (BIOS) that is stored in solid state memory of the computer to in turn copy a larger operating system such as Windows (a trademarked name) or Linux from a hard disk drive into the memory of the computer.

Alternatively, a computer can be booted from a device other than a hard disk drive. For example, a computer can be booted from a floppy drive, a memory key, CD-ROM, etc. As recognized herein, booting from an alternate source has a higher risk of introducing viruses into the computer than does booting from the hard disk drive. As also recognize herein, however, computers typically do not record the source from which they were booted. The present invention understands that it would be desirable to know when a higher risk source has been used for booting so that preemptive corrective action can be undertaken.

SUMMARY OF THE INVENTION

A method includes identifying a primary boot source for a computer and, using the computer, determining whether the computer is to be booted from the primary boot source. If the computer is not to be booted from the primary boot source, one or more anti-virus actions automatically can be executed. Without limitation, the anti-virus action can include a virus scan, or a re-imaging of the primary boot source.

In some embodiments the primary boot source can be a hard disk drive (HDD). In non-limiting implementations the primary boot source can include an identification, and the determining act can include hashing the identification with a secret to render a hash result, comparing the result to a stored value, and if the value matches the result determining that the computer is to be booted from the primary boot source, and otherwise determining that the computer is not to be booted from the primary boot source. The stored value may be, e.g., a hash of the secret with a serial number of the primary boot source. Booting may be completed prior to automatically executing the anti-virus action.

In another aspect, a computer system includes a BIOS receiving a boot command and executing logic in response. The logic may include, prior to completing booting, determining whether booting is to be from a primary boot source or from a secondary boot source. Only if booting is to be from the secondary boot source, a signal is generated and then booting completed. The signal is useful in alerting a person or machine that booting was not from the primary boot source.

In still another aspect, a computer system has a processor, means accessible to the processor for booting, and means embodied in the means for booting for generating a signal useful for alerting an entity (such as a person or a processor) that booting is not from a primary boot source.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
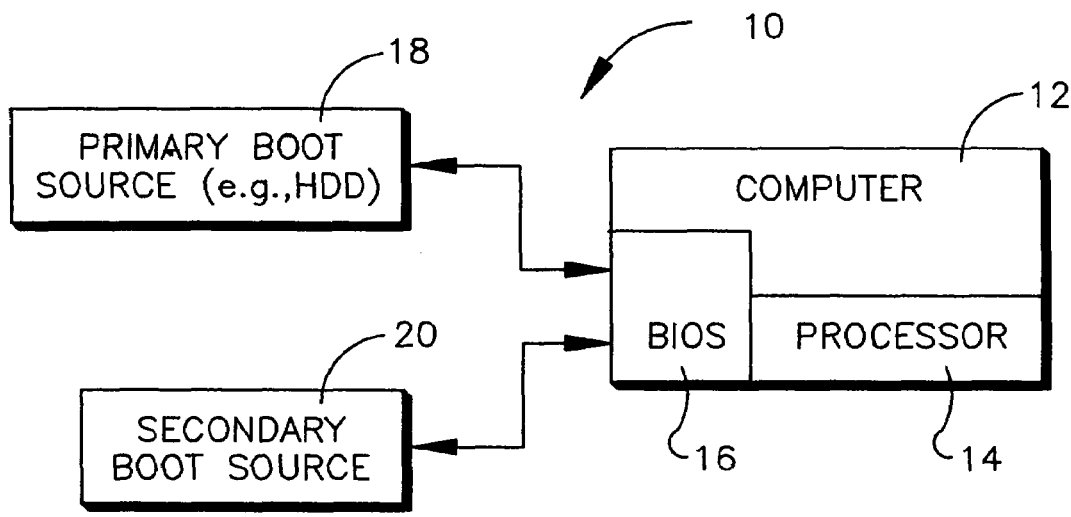
FIG. 1 is a block diagram of a non-limiting system in accordance with the invention.

FIG. 1 shows that a non-limiting system 10 in which the present invention may be embodied includes a computer 12 with processor 14 that can execute a basic input-output system (BIOS) 16 to boot a main operating system from a primary boot source 18 such as but not limited to a hard disk drive (HDD) or from a secondary boot source 20 such as but not limited to a floppy drive. The computer 12 typically includes additional components, such as input and output devices, internal solid state data storage, etc.

Figure 2:
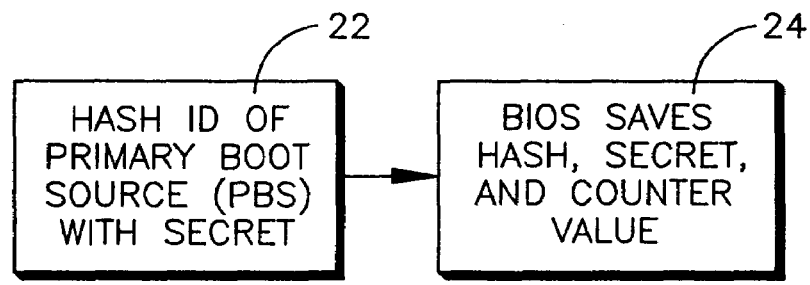
FIG. 2 is a flow chart of the initialization logic.

The system 10 is initialized in accordance with present principles beginning at block 22 in FIG. 2, wherein in one non-limiting implementation an identification of the primary boot source 18 can be hashed with a secret to render a hash value. If the primary boot source 18 is a HDD, the identification can be, e.g., the model number and serial number of the HDD. At block 24, BIOS saves the hash value and the secret. Also, a counter value which may be initialized at zero is stored at block 24. The values may be stored in, e.g., non-volatile random access memory of the computer 12.

Figure 3:
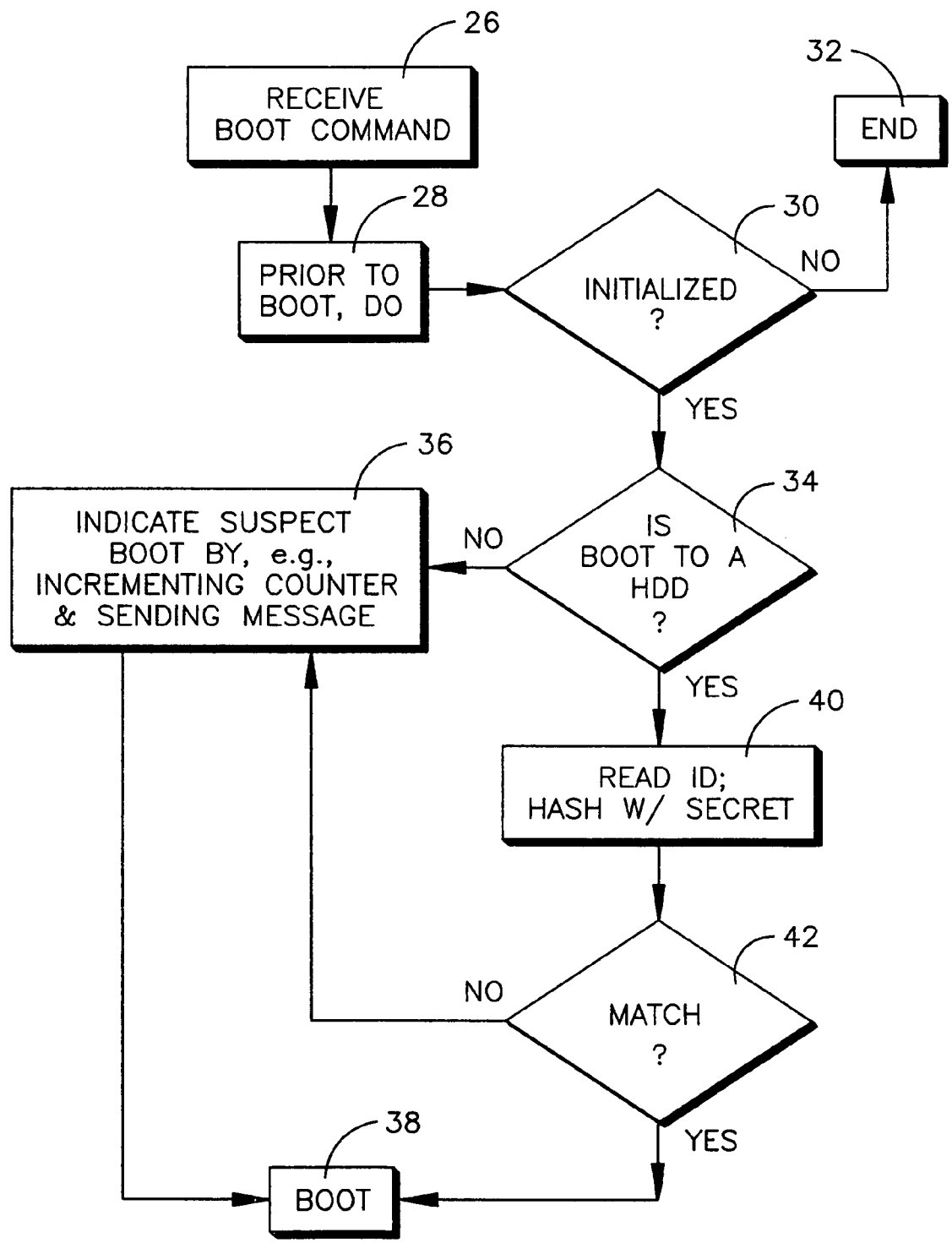
FIG. 3 is a flow chart of the logic executed at run time of booting.

Turning to FIG. 3, when a boot command is received by BIOS at block 26 (when, for instance, a user turns on the computer 12 or issues a restart command), the logic enters a DO loop at block 28 prior to completing the boot. If it is determined at decision diamond 30 that the initialization logic of FIG. 2 has not been executed, the logic ends at state 32 and conducts conventional booting.

When the logic of FIG. 2 has been performed, however, the logic flows from decision diamond 30 to decision diamond 34, which may be implemented when, for instance, the primary boot source 18 is a HDD. At decision diamond 34 it is determined whether the boot source is a HDD. If it is not, the logic flows to block 36 to indicate a suspect boot by, for example, incrementing the counter that was initialized at block 24 and/or by sending a message to a user or to the processor 14 of the computer 12, for purposes to be shortly disclosed. In one non-limiting implementation the counter value can be sent via an ASF message to the computer 12 or other network device or the counter value can be messaged locally via a manufacturer-unique SMBIOS structure. Booting may then be completed at block 38 prior to, concurrent with, or after the reset/corrective logic of FIG. 4.

On the other hand, even if it is determined at decision diamond 34 that the boot source is a HDD, as understood herein this does mean that the boot source necessarily is the primary boot source because the HDD intended to have been the primary boot source could be exchanged with another HDD. Accordingly, proceeding to block 40 BIOS issues an appropriate command to the boot source for its identification. The identification is hashed with the secret that was stored by BIOS during initialization to render a hash result, and at decision diamond 42 the hash result is compared to the hash value that was also stored by BIOS during initialization to determine whether the hash result determined at block 40 matches the hash value stored at block 24 in FIG. 2. When no match is found, the logic loops back to block 36 to indicate a suspect boot, but otherwise, in the event of a match, the logic proceeds directly to block 38 to complete the boot.

Figure 4:
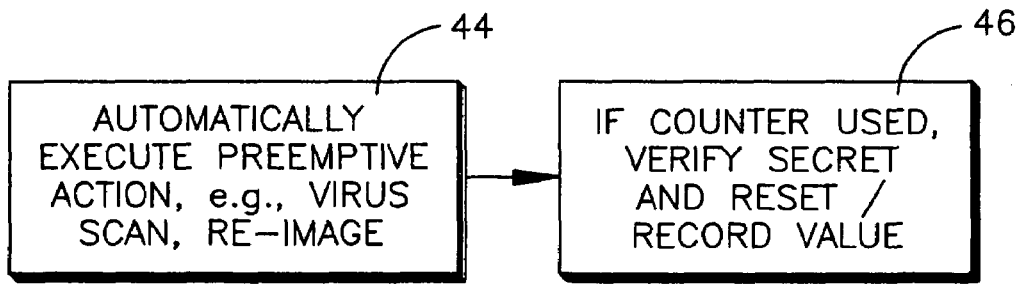
FIG. 4 is a flow chart of the post-run time logic.

In response to the indication of a suspect boot at block 36, the logic of FIG. 4 may be implemented. Commencing at block 44, the processor 14 or other processor can execute what might be thought of as a management agent to, for instance, read the counter value that was conveyed at block 36. If the counter value is not an expected value, preemptive action can be automatically executed if desired, e.g., a virus scan can be automatically implemented, or the entire primary boot source can be re-imaged, or other action as appropriate. In one implementation, the expected value of the counter is zero, although the expected counter value simply could be a previously recorded non-zero value. In the simple case where the expected counter value is always zero, after preemptive action at block 44 has been completed, at block 46 the secret value can be verified to ensure authentication and then the counter value can be reset to zero, effectively arming the system for the next boot.

The following provides an illustrative example of one non-limiting implementation of aspects of the invention. In this non-limiting implmentation, at the end of each boot and prior to executing any code outside the system, BIOS 16 can build the following data structures.

1 Architecture

This section defines the data that can be used to implement one non-limiting embodiment of the invention, given here for illustration only. At the end of each boot and prior to executing any code outside the system, the BIOS may build the following data structures.

1.1 SMBIOS

Figure 5:
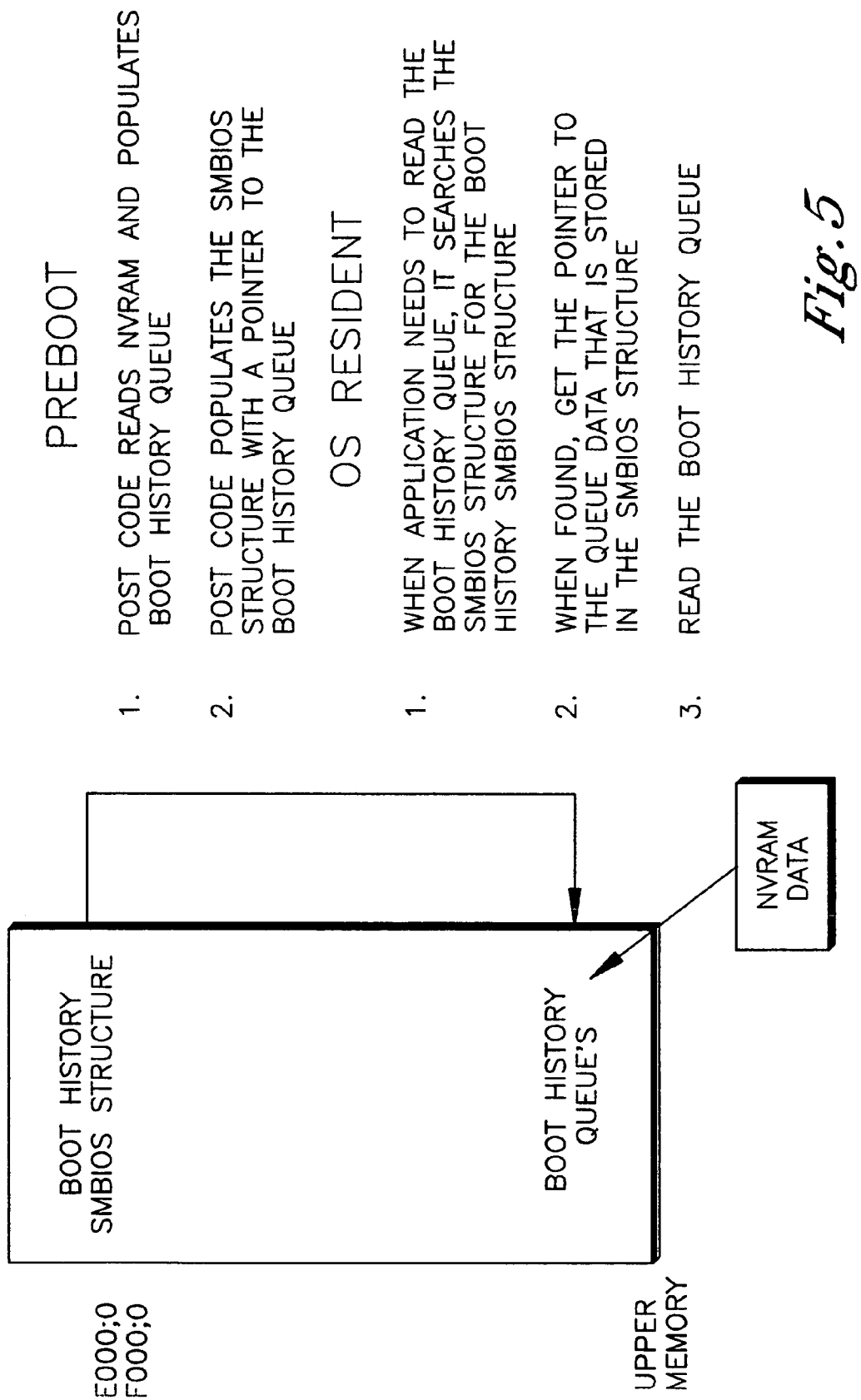
FIG. 5 is a diagram of a non-limiting Boot History Queue Structure.

In the following non-limiting implementation, a new SMBIOS structure can be added to the system. This structure can be used to find the Boot History Queue Structure, shown in FIG. 5. OS resident software can find the Boot History Queue by searching the SMBIOS data for the OEM specific structure indicator (85h) and then verifying the structure by verifying the ASCII text at the end of the string. This test is desirable since multiple structure 85h's can reside in the system. Once this has been verified, this structure contains a pointer with the physical address of the Boot History Queue.

SMBIOS Structure Format

| Offset (Hex) | Field Name | Field Length | Value (Hex) | Description |
| --- | --- | --- | --- | --- |
| 0 | Type | Byte | 85 | OEM Specific Structure |
| 1 | Length | Byte | 0x11 | Computed by BIOS |
| 2 | Handle | Word | Varies | Architected SMBIOS data |
| 4 | Version | 4 Bytes | Varies(ASCII X.Y where X is the major version and Y is the minor version level) | Version of the boot history spec this structure supports |
| 8 | PTR to the Boot History Queue | 8 Bytes | Varies | A physical memory pointer to the Boot History Queue |
| 0x10 | String indicator | Byte | 1 | Architected SMBIOS data |
| 0x11 | Description String | String | Varies | "Audit Boot History" |

Note:
There may be multiple type 85h SMBIOS structures in a system's BIOS. The correct type 85h will have the "Audit Boot History" string embedded in it. The BAR presence detection algorithm should search for the type 85h structure and the "Audit Boot History" string.

1.2 Boot History Queue Structure

Figure 6:
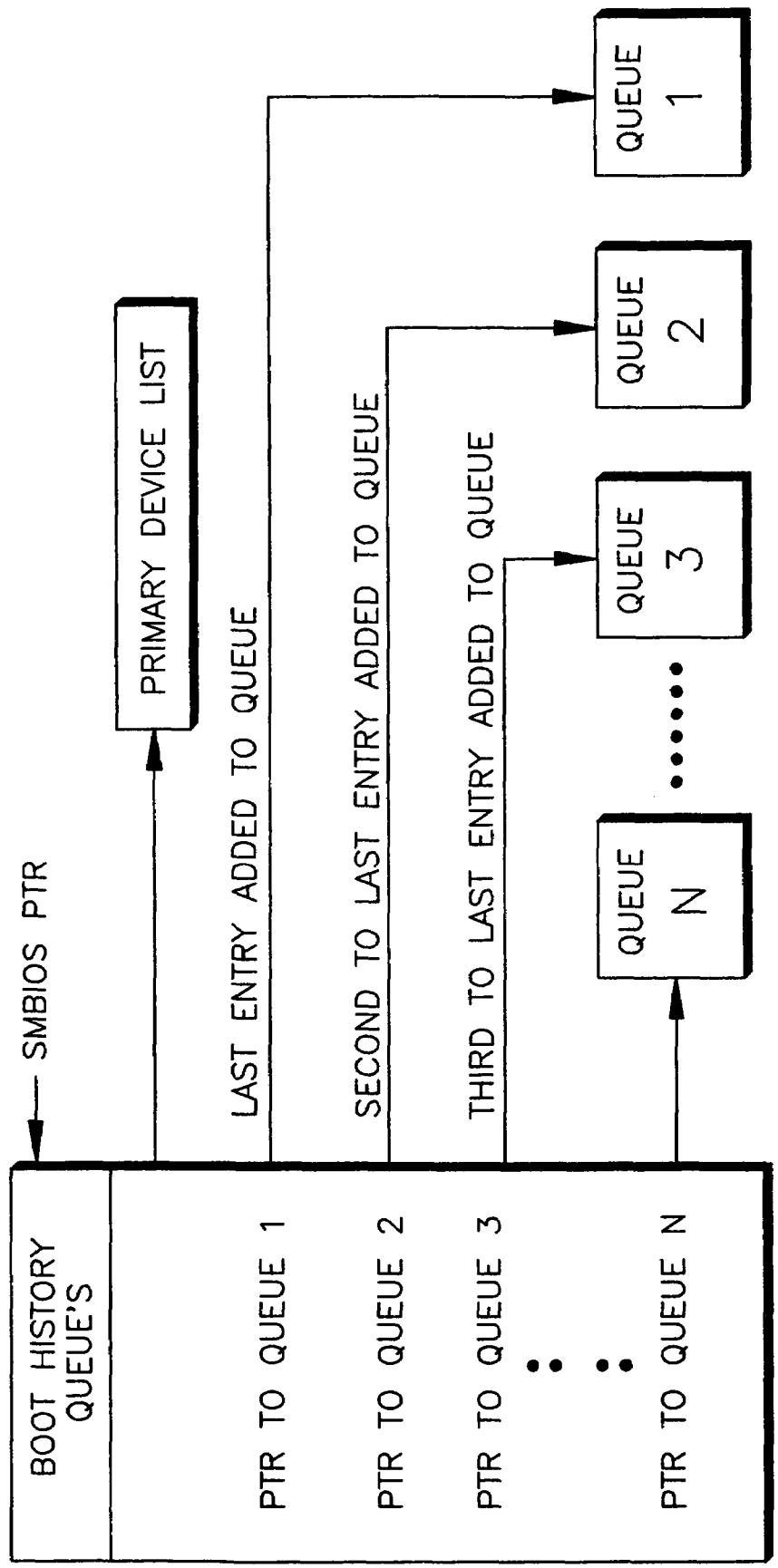
FIG. 6 illustrates features of the Boot History Queue Structure.

The purpose of the Boot History Queue Structure is to define data that is common to all of the queues and to define pointers to the actual data (as shown in FIG. 6). The queue entries may be prioritized from latest to oldest entry. The date of the last entry added to the queue also may be included in the structure so that an OS application can determine whether a new entry has been added to the queues. A wrap counter can be maintained to indicate if a new entry was added to the queue before the OS has had the opportunity to read the queues. This indicator can be reset on the second boot from the primary boot source.

Boot History Queue Structure

| Offset | Definition | Value | Length (bytes) | Comment |
| --- | --- | --- | --- | --- |
| 0 | Signature | $BHQF$ (24 42 48 51 46 24) | 6 | Can be used to validate data in memory |
| 6 | Length of structure | Varies | 2 | Length of the Boot History Queue Format (does not include length of Queues) |

-continued

Boot History Queue Structure

| Offset | Definition | Value | Length (bytes) | Comment |
|---|---|---|---|---|
| 8 | Checksum | Varies | 1 | 1 Byte checksum (addition of all bytes in this structure with the exception of this byte) |
| 9 | Reserved | 0 | 1 | |
| 0x0A | Number of Queue entries | Varies | 1 | Number of queue entries |
| 0x0B | Number of entries in the Primary Device Queue | Varies | 1 | Number of devices listed in the primary device queue |
| 0x0C | Year last entry was added to Queue | Varies | 2 | Year (in hex) that last queue entry was added queue |
| 0x0E | Month | Varies | 1 | Month (in hex) last entry was added to queue |
| 0x0F | Day | Varies | 1 | Day (in hex) of the month that last entry added to queue |
| 0x10 | Hour | Varies | 1 | Hour (24 hour - in hex) which last entry was added to queue |
| 0x11 | Minute | Varies | 1 | Minute (in hex) which last entry added to queue |
| 0x12 | Wrap | Varies | 1 | 0 - We are booting from the primary hard disk.<br>1 - Booted once to an insecure device since we last booted to the primary hard disk.<br>2 - Booted twice to insecure devices since we last booted to the primary hard disk.<br>3 - We have booted three or more times to insecure devices since we last booted to the primary hard disk.<br>On the first primary device boot after any insecure boots, the counter will be preserved. It will be reset on the following boot. |
| 0x13 | Pointer to Primary Device Queue | Varies | 8 | Points to a queue which defines the list of primary devices |
| 0x1B | Queue PTR | Varies | (# of Queue entries × 8) | 8 Byte pointer to each queue entry |

1.3 Queue Structure

Each Queue entry can contain multiple entries, which can be used to help define the characteristic of that boot process. The first byte in the queue structure can define the content of the queue entry. The second byte may be used to define the length of the entry and the last entry can be a variable length structure, which varies depending on the entry. When the system boots to the primary boot source, no queue entries will be written. When the system boots to a secondary boot source, queue entries will be added Booting from an IDE or SCSI boot source is handled can be handled if desired as a unique case. In a non-limiting implementation, the first time a system boots to the boot source, an entry will be added to the queue (New_HDD as defined in the Queue Value table below). Additional boots will cause no entries in the queues until a new boot source is booted. When this occurs, an additional New_HDD will be added to the queues.

| Offset | Definition | Value | Length (byte) | Comment |
|---|---|---|---|---|
| 0 | Queue Value | (see valid values in following tables) | 1 | Defines the content of this entry in the queue |

-continued

| Offset | Definition | Value | Length (byte) | Comment |
|---|---|---|---|---|
| 1 | Length of Queue | Varies | 1 | Length of this queue entry |
| 2 | Data associated with Queue value | Varies | Varies | Data varies per the definition of the Queue Value |

Sample Queue:

| Offset | Data | Comments |
|---|---|---|
| 0 | 0x02 | "New HDD" queue entry |
| 1 | 0x02 | Queue entry length |
| 2 | 0x7F | "Last entry in the queue" entry |
| 3 | 0x02 | Queue entry length |

The following entries do not require the data in offset 2. The length in these entries (offset 1) will be 2.

Queue Value

| Definition | Queue Value | Comment |
|---|---|---|
| End of Queue | 0x7f | Last entry in the queue |
| Network** | 1 | Client attempted to boot to the Network |
| New_HDD | 2 | Client booted to a new boot source |
| Removable Device | 3 | Client booted to a removable device |
| BIOS configuration parameter have changed | 0x10 | Client saved new settings after entering ROM based setup |
| Tamper Error | 0x11 | Client detected a tamper event |
| Configuration Error | 0x12 | Client had an configuration error |
| BIOS Flashed | 0x13 | Client BIOS has been Flashed |
| Time and Date has been changed | 0x14 | BIOS detects that Time and Date has changed |

**Network queue entries have 1 boot cycle latency.

Additional queue data that may be used:

Queue Value

| Definition | Queue Value | Additional Data | Comment |
|---|---|---|---|
| Time of Event | 0x60 | Time and Date(same format as SMBIOS Structure) | Each entry could be time stamped |
| Boot Code Hash | 0x61 | 20 Byte of first TBD bytes of Boot Code | Defines what media was booted |
| Device Hash | 0x62 | 20 Byte Hash of the device serial number/model (if available) | Defines the device that was booted |

1.4 Primary Device List Structure

| | Definition | Value | Length | Comment |
|---|---|---|---|---|
| 0 | Primary Device | Varies | 20 bytes | Hash of drive indicator (suggest SHA-1 hash of data returned in the identify device command which consists of: Serial Number Model Number |
| 0x14 | Primary Device 2 | Varies | 20 Bytes | Same as above |
| . | . | . | . | . |
| . | . | . | . | . |
| . | . | . | . | . |
| N | Primary Device n | Varies | 20 Bytes | Same as above |

2 Model

When the system is booted to the "expected" (booted from at least twice) primary boot course 18, in a non-limiting implementation BIOS can send to following PUSH message to AMT (which is then formatted into a PET message sent on to the network).

Here is an example of the data string sent to AMT:
16 10 0F 6F 02 68 08 FF FF 00 00 40 13
1 Subcommand=16h (Push no retrans)
2 Version=10h (Version 1.0)
3 Sensor Type=0Fh (Firmware)
4 Event Type=6Fh (Sensor-specific)
5 Offset=02h (Progress)
6 Source Type=68h (ASF 1.0)
7 Severity=08h (Noncritical)
8 Sensor Device=FFh (Unspecified)
9 Sensor Number=FFh (Unspecified)
10 Entity=0 (Unspecified)
11 Entity Instance=0

12 Event Data 1=040h (Next byte conforms to ASF spec definitions)

13 Event Data 2=13h (performing system boot (int. 19) (per ASF Spec)

If the system boots to a secondary boot source including, e.g., a network, an expanded message can be sent to AMT with the details of the event.

Here is an example in which the system was booted to a "new" hard disk and then twice to a diskette (removable media):

15 10 0F 6F 02 68 10 FF FF 22 00 6A 13 03 03 02
1 Subcommand=15h (Push with retransmit)
2 Version=10h (Version 1.0)
3 Sensor Type=0Fh (Firmware)
4 Event Type=6Fh (Sensor-specific)
5 Offset=02h (Progress)
6 Source Type=68h (ASF 1.0)
7 Severity=10h (Critical—(abnormal boot device being used))
8 Sensor Device=FFh (Unspecified)
9 Sensor Number=FFh (Unspecified)
10 Entity=22h (34d) (BIOS Supplying this info)
11 Entity Instance=0
12 Event Data 1=06Ah (Next byte is ASF standard def., last 3 are OEM SPECIFIC)
13 Event Data 2=13h (Same as system boot (int. 19) in ASF Spec)
14 Event Data 3 Most recent BAR queue entry
15 Event Data 4 Next most recent BAR queue entry
16 Event Data 5 Oldest BAR queue entry Added non-limiting information
NVRAM Required Addes non-limiting information
NVRAM Required

| Field | Size (Bytes) | Default | Definition |
|---|---|---|---|
| Time of Day | 4 | Date Today | Set when new queue entry is added |
| Integrity Metric (1 byte checksum) | 1 | N/A | 1 byte sum of all the data in this structure |
| Network Tracker | 1 | 0 | Bit 0 - PXE Called |
| Primary HD ID | 20 | 0 | 20 byte hash of data in the format as defined in section 1.4 |
| Queue Pointer | 1 | 1 | Bits<br>0- Entry for last queue<br>1<br>2- Entry for last queue entry<br>3 where HF Booted<br>4- Wrap Indicator<br>5 00: 1 non primary HDD boot<br>01: 2 non primary HDD boot<br>10: 3 non primary HDD boot<br>11: primary HDD boot |
| Queue Date | 3 | 0x7f, 0x7f, 0x7f | Wrapping table that defines the last 3 boot devices. |
| TOTALS | 30 | | |

| Time Format | | | | | | |
|---|---|---|---|---|---|---|
| Data Type | Year | Reserved | Month | Day | Hour | Minute |
| Numerical Range | 0-255 (8 bits) Offset from year 2000 | Reserved | 1-12 (4 bits) | 1-31 (5 bits) | 0-23 (5 bits) | 0-59 (6 bits) |
| Bit Position | 31 : 24 | 23 : 20 | 19 : 16 | 15 : 11 | 10 : 06 | 05 : 00 |

Code Flows

Collect HDD Information

Collect hard disk drive information as the drives are being parsed in order to create the hash (without adding more time to the boot sequence). Needed drive information: drive number, HDD name, HDD serial number.

BHQF Preparation

Allocate memory Space

Create BHQF Structure

Create SMBIOS structure with the address of the BHQF structure.

Check if the previous boot was a network boot and save it in saveNWbootFlg in SMI space.

Boot Time

The following functions are called in the specified order:

```
NVRAMupdate( )
{
    VerifyNvramBARstructure( );
    CheckForNetworkBoot( );
    earlyCheckNetworkBoot( );
    CheckWrapIndicator( );
    CheckHddBoot(bootDevice);
    UpdateBARtimeStamp( );
```

-continued

```
    CheckRemovableDeviceBoot(bootDevice);
    CheckNetworkBoot(bootDevice);
    UpdateChecksum(NVRAM);
}
BHQFupdate( )
{
    UpdateBHQFstructure( )
    UpdateChecksum(BHQF);
    SendAMTinfo(QueueChangeIndicator, BootDeviceList[3]);
}
```

VerifyNvramBARstructure( )

This function preferably executes prior to any NVRAM activity.

```
If ( (NVRAM_Integrity_Metric is not valid) OR
    (NVRAM_Time_of_Day==0) )
{
    NVRAM_Time_of_Day = Current Time of Day;    /* write current
                                                   time to queue
    NVRAM_Network_Tracker = 0;                   /* Set status
                                                   PTR's to Null
    NVRAM_Queue_Pointer = 0;
    NVRAM_Queue_Data[0]= END_OF_Queue;           /* Set all Queue
                                                   flag to
```

-continued

This function preferably executes prior to any NVRAM activity.

```
NVRAM_Queue_Data[1]= END_OF_Queue;    /* indicate no
                                         entry (0x7f)
NVRAM_Queue_Data[2]= END_OF_Queue;
NVRAM_Primary_HD_ID = 0;              /* set this value to
                                         zero to
                                      /* indicate no
                                         valid data
NVRAM_Integrity_Metric - Checksum(NVRAM);  /* calculate new
                                      /* checksum
}                                     /* value
``` earlyCheckForNetworkBoot( )

```
If (NVRAM_Network_Tracker == 1)
    {
        saveNWbootFlg = 1;
        NVRAM_Network_Tracker = 0;
    }
```

AddBootQueue(device) Function

```
If (LastQueuePointer == MaxQueueValue)
    {
        LastQueuePointer = 0;
    } else {
        increment LastQueuePointer;
    }
Queue[LastQueuePointer] = device;
Queue[LastQueuePointer+1] = 2;
Queue[LastQueuePointer+2] = 0x7F;
Queue[LastQueuePointer+3] = 2;
```

CheckWrapIndicator( ) Function
    BHQF.Wrap=NVRAM_WrapIndicator

IncrementWrapIndicator( ) Function

```
If (NVRAM_WrapIndicator <      /* MaxWrapIndicator is 2 in
MaxWrapIndicator)              /* the current implementation
    {
        increment NVRAM_WrapIndicator;
    }
```

CheckForHDDboot(bootDevice) Function

```
If (bootDevice==HDD)
    {
    If (HDDboot_hash != PrimaryDeviceHash)
        {
            AddBootQueue(NEW_HDD);
            IncrementWrapIndicator( );
            NVRAM_Network_Tracker = 0;    /* Set status PTR to Null
        }
    }
```

CheckNetworkBoot(bootDevice) Function

```
If (saveNWbootFlg == TRUE)
{
    AddBootQueue(Network);
    IncrementWrapIndicator( );
    saveNWbootFlg= 0;
}
If (bootDevice == NETWORK)
    {
        NVRAM_Network_Tracker = 1;     /* Set status PTR indicate a
    exit NVRAMupdate                   /* Network boot.
    }
```

UpdateBHQFstructure( ) Function

```
BHQF.TimeStamp=ConvertTimeStamp(NVRAM_Timestamp);
BHQF.NumberOfQueueEntries=3;  /* In one implementation
                              /*there are only 3 entries.
BHQF.NumberOfPrimaryDevices=1;  /* In another
                              /* implementation there is
                              /* only 1 entry.
BHQF.PointerToPrimaryDeviceQueue=
    addressOf(PrimaryDeviceQueue);
BHQF.PointerToQueue[0] = addressOf(Queue[0]);
BHQF.PointerToQueue[1] = addressOf(Queue[1]);
BHQF.PointerToQueue[2] = addressOf(Queue[2]);
FillQueue(0, LastQueuePtr);
FillQueue(1, LastQueuePtr-1);
FillQueue(2, LastQueuePtr-2);
```

FillQueue(QueueNumber, NVRAMqueuePtr) Function

```
Queue[QueueNumber][0] =            /* Fill in:
    NVRAM_Queue[NVRAMqueuePtr];   /*   Queue Device
Queue[QueueNumber][1] = 2;         /*   Current Queue Entry Size
Queue[QueueNumber][2] = 0x7F;      /*   End Of Queue
                                         indicator
Queue[QueueNumber][3] = 2;         /*   Current Queue Entry Size
```

SendAMTinfo(QueueChangeIndicator, BootDeviceList[3]) Function

```
If (QueueChangeIndicator == TRUE)
    {
        Send Extended boot notification message to AMT
    }
else
    {
        Send standard boot notification message to AMT
    }
```

While the particular METHOD AND APPARATUS FOR TRACKING BOOT HISTORY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A method comprising:
identifying a primary boot source for a computer;
using the computer, determining whether the computer is to be booted from the primary boot source; and
if the computer is not to be booted from the primary boot source, automatically executing at least one anti-virus action, wherein the primary boot source includes an identification, and the determining act at least in part includes hashing the identification with a secret to render a hash result, comparing the result to a stored value, and if the value matches the result determining that the computer is to be booted from the primary boot source, and otherwise determining that the computer is not to be booted from the primary boot source, wherein the stored value is a hash of the secret with at least a serial number of the primary boot source.

2. The method of claim 1, wherein the anti-virus action includes a virus scan.

3. The method of claim 1, wherein the anti-virus action includes re-imaging the primary boot source.

4. The method of claim 1, wherein the primary boot source is a hard disk drive (HDD).

5. The method of claim 1, wherein the determining act is executed by a computer BIOS.

6. The method of claim 1, comprising completing booting prior to automatically executing at least one anti-virus action.

7. A computer system, comprising:
a BIOS receiving a boot command and executing logic comprising:
prior to completing booting, determining whether booting is to be from a primary boot source or from a secondary boot source that is not a hard disk drive; and
only if booting is to be from the secondary boot source, generating a signal and then completing booting, the signal being useful in alerting a person or machine that booting was not from the primary boot source, wherein the primary boot source includes an identification, and the BIOS determines the boot source at least in part by hashing the identification with a secret to render a hash result, comparing the result to a stored value, and if the value matches the result determining that the boot source is the primary boot source, and otherwise determining that the boot source is not the primary boot source, wherein the stored value is a hash of the secret with at least a serial number of the primary boot source.

8. The system of claim 7, wherein the signal causes automatic execution of at least one anti-virus action.

9. The system of claim 8, wherein the anti-virus action includes a virus scan.

10. The system of claim 8, wherein the anti-virus action includes re-imaging the primary boot source.

11. The system of claim 7, wherein the primary boot source is a hard disk drive (HDD).

12. A computer system, comprising:
a processor;
means accessible to the processor for booting; and
means embodied in the means for booting for generating a signal useful for alerting an entity that booting is not from a primary boot source, wherein the primary boot source includes an identification, and the means for booting determines the boot source at least in part by hashing the identification with a secret to render a hash result, comparing the result to a stored value, and if the value matches the result determining that the boot source is the primary boot source, and otherwise determining that the boot source is not the primary boot source, wherein the stored value is a hash of the secret with at least a serial number of the primary boot source.

13. The system of claim 12, comprising means embodied in the means for booting for, prior to completing booting, determining whether booting is to be from a primary boot source or from a secondary boot source, the means for generating being responsive to the means for determining such that only if booting is to be from the secondary boot source, the means for generating generates the signal.

14. The system of claim 12, wherein the signal causes automatic execution of at least one anti-virus action.

15. The system of claim 14, wherein the anti-virus action includes a virus scan.

16. The system of claim 14, wherein the anti-virus action includes re-imaging the primary boot source.

17. The system of claim 12, wherein the primary boot source is a hard disk drive (HDD).

* * * * *

UNITED STATES PATENT AND TRADEMARK OFFICE
CERTIFICATE OF CORRECTION

PATENT NO. : 7,590,834 B2 Page 1 of 1
APPLICATION NO. : 11/352499
DATED : September 15, 2009
INVENTOR(S) : Challener et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this

Twenty-first Day of September, 2010

David J. Kappos
*Director of the United States Patent and Trademark Office*